United States Patent [19]

Richter

[11] Patent Number: 5,066,834

[45] Date of Patent: Nov. 19, 1991

[54] FLEXIBLE GUIDE RAIL AND METHOD FOR MANUFACTURING SAME

[76] Inventor: Hans Richter, Ortierstrasse 77, D-8900 Augsburg, Fed. Rep. of Germany

[21] Appl. No.: 478,515

[22] PCT Filed: Jun. 9, 1989

[86] PCT No.: PCT/EP89/00647

§ 371 Date: Feb. 12, 1990

§ 102(e) Date: Feb. 12, 1990

[87] PCT Pub. No.: WO89/12595

PCT Pub. Date: Dec. 28, 1989

[30] Foreign Application Priority Data

Jun. 13, 1988 [DE] Fed. Rep. of Germany ....... 3820055

[51] Int. Cl.⁵ ............................................. H02G 1/02
[52] U.S. Cl. ..................................... 191/40; 238/134; 264/285; 138/175
[58] Field of Search .................. 191/33 R, 33 PM, 34, 191/40; 238/1, 15, 122, 134, 135, 150, 129, DIG. 1; 52/724, 725, 727, 728, 743, 744; 138/118, 174, 175; 273/73 H; 264/285, 333, 269, 256, 259, 70

[56] References Cited

U.S. PATENT DOCUMENTS

| | | | |
|---|---|---|---|
| 987,413 | 3/1911 | Brown | 238/7 |
| 1,339,046 | 5/1920 | Plattern | 238/50 X |
| 1,389,781 | 9/1921 | Peifer | 238/125 X |
| 2,115,135 | 4/1938 | Benbow | 191/34 X |
| 2,816,323 | 12/1957 | Munger | 138/175 X |
| 2,993,647 | 7/1961 | Deller | 238/122 |
| 3,090,326 | 5/1963 | Goodell et al. | 238/122 X |
| 3,271,917 | 9/1966 | Rubenstein | 52/724 X |
| 3,487,518 | 1/1970 | Hopfeld | 273/73 H X |
| 3,623,203 | 11/1971 | Henshaw et al. | 273/73 H X |
| 3,705,709 | 12/1972 | Andriussi | 52/725 X |
| 3,967,560 | 7/1976 | Simon | 52/724 X |
| 3,972,529 | 8/1976 | McNeil | 52/727 X |
| 4,205,420 | 6/1980 | Bothwell | 138/175 X |
| 4,241,664 | 12/1980 | Cable | 238/1 X |
| 4,280,657 | 7/1981 | Ramer | 238/130 X |
| 4,313,383 | 2/1982 | Parazader | 52/724 X |
| 4,412,561 | 11/1983 | Sakaguchi et al. | 138/175 X |
| 4,450,873 | 5/1984 | Sadler et al. | 138/175 X |
| 4,722,156 | 2/1988 | Sato | 52/725 X |
| 4,876,054 | 10/1989 | Goodwin | 264/333 |

FOREIGN PATENT DOCUMENTS

| | | |
|---|---|---|
| 1804616 | 3/1970 | Fed. Rep. of Germany . |
| 2359972 | 12/1975 | Fed. Rep. of Germany . |
| 1072542 | 9/1954 | France ................ 238/122 |
| 337322 | 5/1959 | Switzerland ............ 52/724 |
| 354110 | 6/1961 | Switzerland ........... 238/129 |
| 1551011 | 8/1979 | United Kingdom . |

Primary Examiner—Robert J. Spar
Assistant Examiner—Scott L. Lowe
Attorney, Agent, or Firm—Antonelli, Terry, Stout & Kraus

[57] ABSTRACT

A method for manufacturing multi-dimensionally curved guide rails having tubular cross-sections for passenger and material transportation systems, in which a hose-like plastic tube of any tubular cross-section is bent according to requirements and subsequently filled with a filling compound to stabilize the shape.

8 Claims, 1 Drawing Sheet

FLEXIBLE GUIDE RAIL AND METHOD FOR MANUFACTURING SAME

The invention concerns guide rails for passenger and material transportation systems as are used e.g. in inclined staircase lifts, cable and tow lifts, overhead material conveyers for carrying or conveying cars, slides or individual pulleys.

BACKGROUND OF THE INVENTION

Guide rails of the above type, as can be seen for example in DE-PS 32 14 044, are formed, depending on the intended use, with guides or gravity-roller conveyers for the car or slide to be guided, grooves for pulley chain cables or slip-ring trolley tracks.

In addition to straight guide rails, double-curved guide rails are often required in order to be able to make maximum use of on-site space conditions.

A double-curved guide rail of this kind is described in DE-AS 10 99 936, in which the guide rail of the monorail track has sections made of an elastic material, such as rubber or the like, which are sufficiently hard to absorb the roller pressure and flexible enough to allow the track to be bent and which are fastened at stays spaced from one another.

Double-curved guide rails have to date been theoretically constructed with respect to their lengths and curves either by calculations in advance or determined according to local conditions by taking measurements and model type at the construction site and then finished in the factory and only then installed at the construction site. Due to cost and manufacturing techniques, curvatures must therefore always be reduced to simple, basic geometric forms such as arcs and straight lines. This inevitably leads to undesired deviations from the ideal shape.

Due to its high costs, the guide rail has to date only been used for expensive special applications. It is not suitable for inexpensive mass applications.

It is the object of the invention to design guide rails in such a way that they can be shaped and immediately mounted at the construction site to meet space conditions without prior structural calculations and special custom-manufacturing, whereby inexpensive rod or rolled stock is to be used.

This object is solved with the features of claim 1. Advantageous embodiments can be derived from the Figures, showing:

DESCRIPTION OF A PREFERRED EMBODIMENT

Figure 1:
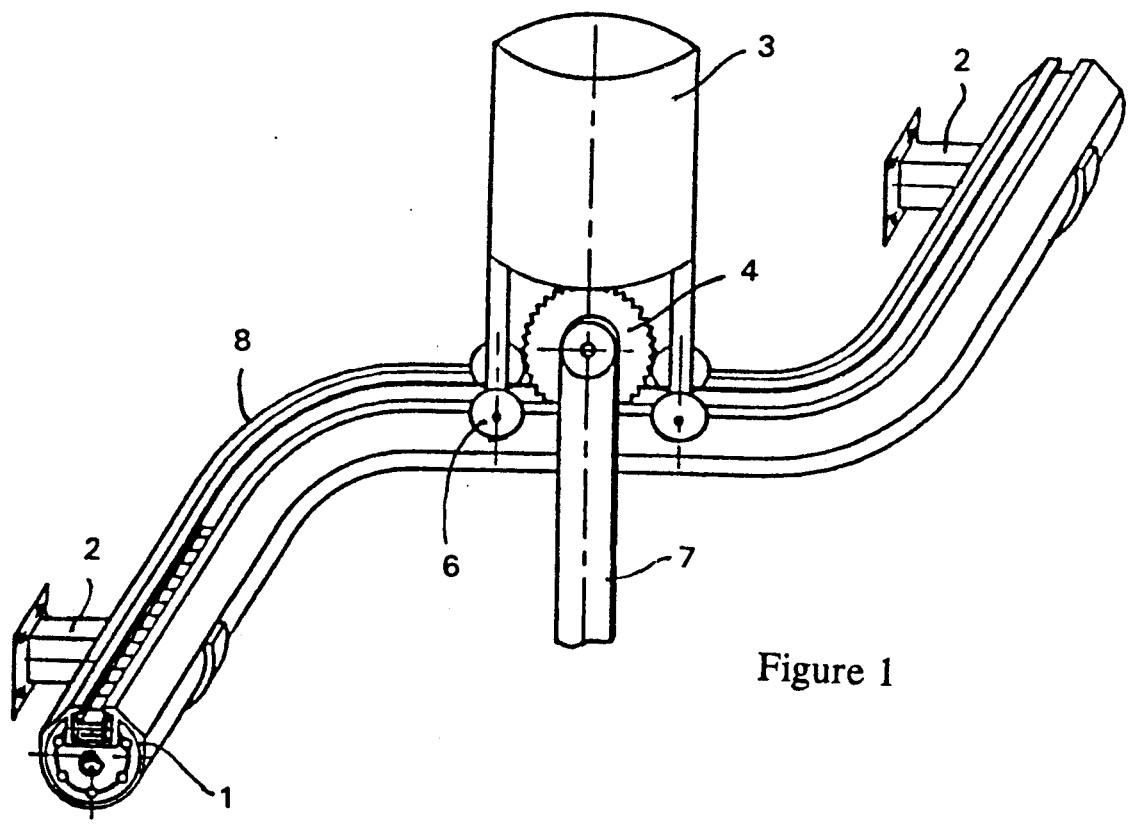
FIG. 1 a three-dimensional illustration of a sample two-dimensionally curved guide rail with mounted rolling carriage.

In the embodiment according to FIG. 1, rolling carriage 3 sits on guide rail 1. Rolling carriage 3 has a motor, not illustrated, with a sprocket 4 which engages in the lateral arc roller chain 5. Rolling carriage 3 has four rollers 6 which are supported by and roll on guide rail 1. The load lifting hook 7, which carries a seat for passenger transportation or a device for loads (not shown), is located at rolling carriage 3.

Figure 2:
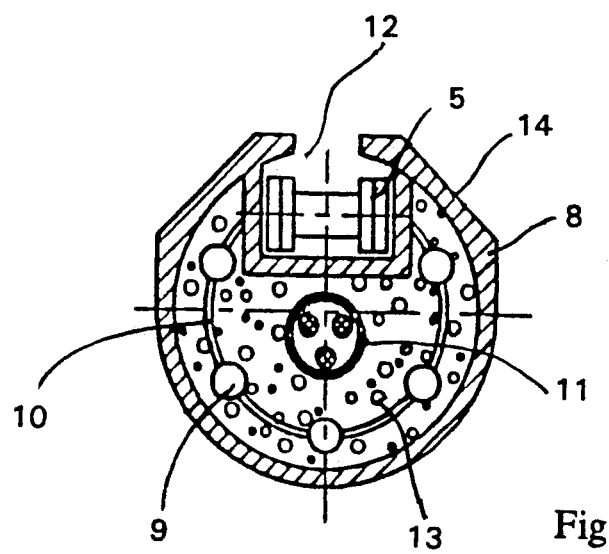
FIG. 2 a cross-section through a sample guide rail.

According to FIG. 2, guide rail 1 consists of a plastic casing 8 which is hollow like a hose. Steel wires 9, which are held in position and separated by range spacers 10, are found in the plastic casing 8. In addition, an electric conductor 11 and a lateral arc roller chain 5, into which sprocket 4 engages and which is embedded in a separate T-groove 12, are found in the plastic casing 8. The remaining hollow spaces 13 in the plastic casing 8 are filled up with cement or a similar substance.

In FIG. 1, guide rail 1 is fixed by mounting supports 2 so as to meet space conditions and comply with individual wishes. Mounting supports 2 are fastened to walls or other supporting structures which are not shown.

When guide rail 1 is being assembled, the flexible plastic casing 8, which has not as yet been filled with cement and only contains the steel wires 9, range spacers 10, electrical conductor 11 and lateral arc roller chain 5, is mounted at the installation site in accordance with space conditions and individual wishes, in that it is bent as desired at appropriate distances and fixed by fastening the mounting supports 2 to the respective supporting structures such as walls, etc.

Without the cement filling, the plastic casing 8 is still so flexible that it can be easily bent, yet so rigid that the desired bending can be carried out smoothly and without breaks. Once this procedure is completed, the plastic casing 8 is filled with liquid cement or the like. It is filled either by pressing or pouring, provided that there is a geodetic difference in elevation of sufficient size.

Once the pressed-in cement mass has hardened, the guide rail becomes stable and rigid. The embedded steel wires 9 assume the necessary tension of the cements compressive forces. The plastic casing assumes the sheathing function for the steel concrete core and represents the guide or gravity-roller conveyer 14.

During assembly, however, one can also proceed in such a way that the empty plastic casing is laid first and then, prior to inserting the cement, the steel wires 9, the electrical conductor 11 and the lateral arc chain 5 are inserted.

It has also been provided that the plastic casing 8 has grooves other than T-groove 12, e.g. for current collector lines to transmit current, for hoisting cables or cable laying when current is fed by means of cable drums.

It is also possible to make this flexible guide rail as a static or artistic element and to use it when it is necessary to bend rod stock two or three-dimensionally at the installation site during assembly.

I claim:

1. A method for manufacturing multi-dimensionally curved guide rails having tubular cross-sections for passenger and material transportation vehicle systems characterized by the following steps: bending a hose-like plastic tube of any tubular cross-section, filling said bent tube with a filling compound to stabilize the shape of said tube, said bent and filled tube being provided as a guide rail for enabling guidance of a driven vehicle thereon.

2. The method of claim 1, characterized by inserting armoring wires into the hose-like plastic tube prior to the filling step.

3. The method of claim 1 or 2, characterized by mounting said hose-like plastic tube to mounting supports fastened to a supporting structure after the bending step.

4. The method of claim 1 or 2, characterized by hardening said filling compound prior to said guidance of a driven vehicle thereon.

5. The method of claim 1 or 2, characterized by placing electrical conductors integrally with said hose-like tube prior to the filling step.

6. The method of claim 1 or 2, characterized by providing said hose-like tube with T-grooves.

7. The method of claim 1 or 2, characterized by providing surfaces on the periphery of said hose-like plastic tube for vehicles to drive on.

8. The method of claim 1 or 2, characterized by providing said hose-like plastic tube with more than one cavity in a longitudinal direction.

* * * * *